(12) United States Patent
Greenfield et al.

(10) Patent No.: US 8,996,765 B2
(45) Date of Patent: Mar. 31, 2015

(54) METHODS AND APPARATUS TO MANAGE WORKLOAD MEMORY ALLOCATION

(75) Inventors: Michael R. Greenfield, Gig Harbor, WA (US); Roger Golliver, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 13/992,976

(22) PCT Filed: Dec. 27, 2011

(86) PCT No.: PCT/US2011/067355
§ 371 (c)(1),
(2), (4) Date: Jun. 10, 2013

(87) PCT Pub. No.: WO2013/100896
PCT Pub. Date: Jul. 4, 2013

(65) Prior Publication Data
US 2014/0201477 A1 Jul. 17, 2014

(51) Int. Cl.
*G06F 5/00* (2006.01)
*G06F 13/38* (2006.01)
*G06F 12/02* (2006.01)
*G06F 9/50* (2006.01)

(52) U.S. Cl.
CPC .............. *G06F 12/02* (2013.01); *G06F 9/5016* (2013.01); *G06F 2209/5021* (2013.01); *G06F 2209/501* (2013.01)
USPC .................................. 710/62; 710/16; 710/36

(58) Field of Classification Search
None
See application file for complete search history.

(56) References Cited

U.S. PATENT DOCUMENTS 7,447,681 B2 * 11/2008 Lightstone et al. ................... 1/1
2005/0262323 A1 11/2005 Woo et al.
2009/0037554 A1 2/2009 Herington

FOREIGN PATENT DOCUMENTS

JP 2003-108317 4/2003
JP 2008-305165 12/2008

OTHER PUBLICATIONS

International Searching Authority, "International Preliminary Report on Patentability and Written Opinion," issued in connection with corresponding International Patent Application No. PCT/US2011/067355, mailed Jul. 1, 2014 (7 pages).
"Intel C++ Compiler", Wikipedia, retrieved on Oct. 30, 2011 from <http://en.wikipedia.org/w/index.php?title=lntel_C++_Compiler &printabl> (5 pages).

(Continued)

*Primary Examiner* — Zachary K Huson
(74) *Attorney, Agent, or Firm* — Hanley, Flight & Zimmerman, LLC

(57) ABSTRACT

Methods, articles of manufacture, and apparatus are disclosed to manage workload memory allocation. An example method includes identifying a primary memory and a secondary memory associated with a platform, the secondary memory having first performance metrics different from second performance metrics of the primary memory, identifying access metrics associated with a plurality of data elements invoked by a workload during execution on the platform, prioritizing a list of the plurality of data elements based on the access metrics associated with corresponding ones of the plurality of data elements, and reallocating a first one of the plurality of data elements from the primary memory to the secondary memory based on the priority of the first one of the plurality of memory elements.

30 Claims, 7 Drawing Sheets

(56) References Cited

OTHER PUBLICATIONS

"Profile-Guided Optimization", Wikipedia, retrieved on Nov. 31, 2011 from <http://en.wikipedia.org/w/index.php?title=Profile-guided_optimization&pr> (1 page).

Avissar et al., "An Optimal Memory Allocation Scheme for Scratch-Pad-Based Embedded Systems", ACM Transactions of Embedded Computing Systems, vol. 1, No. 1, Nov. 2002 (21 Pages).

International Searching Authority, "International Search Report", issued in connection with PCT patent application No. PCT/US2011/067355, mailed Sep. 21, 2012 (3 pages).

International Searching Authority, "Written Opinion", issued in connection with PCT patent application No. PCT/US2011/067355, mailed Sep. 21, 2012 (6 pages).

Irelan et al., "Performance Monitoring Unit Sharing Guide," Intel, White Paper, Jun. 29, 2009, retrieved from the Internet Nov. 17, 2011 (13 pages).

Suhendra et al., "WCET Centric Data Allocation to Scratchpad Memory," School of Computing, National University of Singapore, Conference Proceeding of the 26th IEEE Real-Time Systems Symposium, Dec. 8, 2005, retrieved from the Internet Oct. 31, 2011 (10 pages).

\* cited by examiner

| DATA ELEMENT | ACCESS COUNT | WAIT COUNT | PROCESSOR WAIT CYCLE COUNT |
|---|---|---|---|
| ARRAY 1 | 712 | 0 | 0 |
| ARRAY 4 | 40 | 7 | 700 |
| ARRAY 5 | 6,219 | 101 | 5050 |
| ARRAY 9 | 14 | 14 | 140,000 |
| ARRAY 27 | 3,921 | 2,971 | $2.1 \times 10^9$ |

FIG. 2

METHODS AND APPARATUS TO MANAGE WORKLOAD MEMORY ALLOCATION

FIELD OF THE DISCLOSURE

This disclosure relates generally to memory management, and, more particularly, to methods and apparatus to manage workload memory allocation.

BACKGROUND

In recent years, processors have been developed to execute an increasing number of floating point operations per second (FLOPS). Design improvements that contribute to increased FLOPS include, but are not limited to, greater transistor density and multiple cores. As additional transistors and/or cores are added to processors, a corresponding increase in power consumption and heat occurs, which may become counter-productive to FLOPS performance.

BRIEF DESCRIPTION OF THE DRAWINGS

FIG. 2 is an example table indicative of example data elements that request memory access of a platform.

DETAILED DESCRIPTION

Methods, articles of manufacture, and apparatus are disclosed to manage workload memory allocation. An example method includes identifying a primary memory and a secondary memory associated with a platform, the secondary memory having first performance metrics different from second performance metrics of the primary memory, identifying access metrics associated with a plurality of data elements invoked by a workload during execution on the platform, prioritizing a list of the plurality of data elements based on the access metrics associated with corresponding ones of the plurality of data elements, and reallocating a first one of the plurality of data elements from the primary memory to the secondary memory based on the priority of the first one of the plurality of memory elements.

Figure 1:
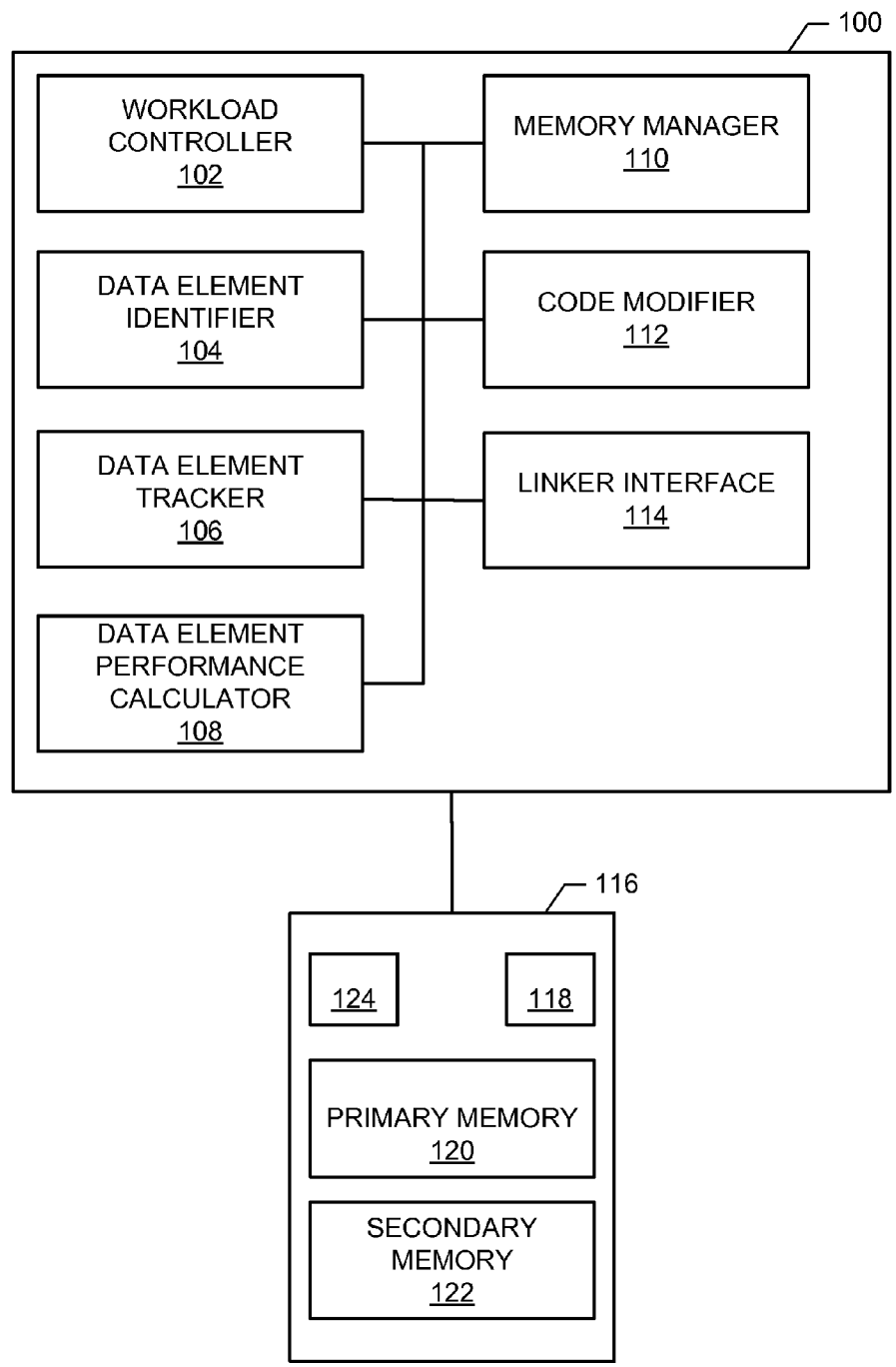
FIG. 1 is a schematic illustration of an example workload manager constructed in accordance with the teachings of this disclosure to manage workload memory allocation.

FIG. 1 is a schematic illustration of an example workload controller 100 to control workload memory allocation. In the illustrated example of FIG. 1, the workload manager 100 includes a workload manager 102, a data element identifier 104, a data element tracker 106, a data element performance calculator 108, a memory manager 110, a code modifier 112, and a linker interface 114. The example workload manager 100 is communicatively connected to an example platform 116 having one or more workloads 118, a primary memory 120, a secondary memory 122, and a processor 124.

The example processor 124 of the platform 116 of FIG. 1 includes any number of cores to execute the example workload 118. The example workload 118 of FIG. 1 may include, but is not limited to one or more programs of executable code (e.g., a binary) generated and linked by a compiler mechanism from source code. The execution of code may include, but is not limited to executing one or more programs, programs having any number of associated dynamic link libraries (DLLs), one or more separate files linked together to the same program, and/or a cluster usage model in which a workload includes a program with any number of shared libraries involving one or more processes. During execution of the example workload 118, the processor 124 may access the primary memory 120 to manipulate and/or otherwise process data. Data may include, but is not limited to, data arrays, files, heap and/or stack. As used herein, references to data, array data and/or data arrays include all types of data that may be processed by the processor 124 and/or stored in primary memory 120 and/or secondary memory 122. As used herein, primary memory 120 includes flash memory, read-only memory (ROM), random access memory (RAM) and/or a hard disk drive memory. Primary memory 120 may include, for example, any type of double data rate (DDR) RAM (e.g., DDR2, DDR3, DDR4, etc.).

In some examples, the secondary memory 122 of the platform 116 includes an enhanced performance design that exhibits a lower latency, coherency, and/or a higher bandwidth capability when compared to the primary memory 120. The example secondary memory 122 may include flash memory, ROM, RAM and/or hard disk drive memory having improved performance metric(s) when compared to corresponding flash memory, ROM, RAM and/or hard disk drive memory corresponding to the example primary memory 120. The example secondary memory 122 may have an associated cost premium based on its improved performance characteristics and, thus, a corresponding size/capacity of the secondary memory 122 may be substantially lower than that of the primary memory 120. Additionally, utilization of the example secondary memory 122 is scrutinized because of its relatively higher cost and lower size. The example secondary memory 122 may include, but is not limited to scratchpad RAM. Scratchpad RAM is a relatively high-speed internal memory, may be coherent, and may be located on the processor 124, near the processor 124 and/or within processor packaging.

In operation, the example workload manager 100 identifies one or more opportunities to improve (e.g., optimize) code that is executed on the example platform 116. As described above, although additional transistors and/or cores added to the processor 124 may yield faster results when executing code, the corresponding heat generation and/or power consumption of the added transistors may eventually provide diminishing returns in FLOPS performance. To improve platform performance when executing one or more workloads 118, the example workload manager 100 identifies memory utilization patterns of the workload 118. In the event a first data array that is created and/or otherwise manipulated by the example processor 124 exhibits a relatively high demand (e.g., a number of read/write operations when compared to a second data array, a degree to which the data array materially impacts workload/platform performance, relative comparisons, etc.), the example workload manager 100 modifies code associated with the example workload 118 to utilize a relatively faster type of memory for such read/write operations. Code modification performed by the example workload manager 100 may include, but is not limited to source code modification, binary modification, dynamic just-in-time (JIT) compiler modification, etc. In some examples, code may be re-linked without one or more compilation operations to, in part, improve speed. The faster type of memory, such as the example secondary memory 122, allows read/write operations to occur with lower latency and/or a higher bandwidth than the primary memory 120, thereby improving the performance of the workload 118 when executing on the example platform 116.

The example workload manager 102 retrieves and/or otherwise receives a workload 118 from the platform 116 and executes the workload in a monitored environment to characterize its operation. In some examples, the workload manager 102 obtains, retrieves and/or otherwise obtains information associated with the example platform 116, such as one or more type(s) of memory utilized and/or otherwise available to the platform 116. As described in further detail below, in the event that the platform 116 includes one or more types of memory having improved operating characteristics (e.g., the secondary memory 122) when compared to the example primary memory 120, then the example workload manager 100 modifies code (e.g., source code, one or more binaries, binaries on a disk to facilitate subsequent execution optimization, etc.) associated with the workload 118 to utilize such memory in an effort to improve platform performance. The example workload manager 102 may invoke the workload 118 one or more times to characterize its data array and memory utilization behavior. In some examples, the workload manager 102 invokes a number of execution iterations of the workload 118 to determine average characteristics. In other examples, the workload manager 102 invokes the workload 118 with one or more input parameters to identify corresponding data array and/or memory utilization behavior (e.g., stress test).

During execution of the example workload 118, the example data element identifier 104 identifies instances of data access to one or more memories of the platform 116, such as the example primary memory 120. The example data element tracker 106 counts a number of detected instances of data access for each data array employed by the example workload 118, and stores such counts for later analysis of the workload 118 behavior. In other examples, collecting and/or monitoring access counts may be insufficient to determine a relative grading of the data array of interest when compared to one or more other data arrays. In such cases, collecting and/or monitoring accesses per unit of time for each data array of interest allows for a relative grading of which data array(s) may contribute the greatest benefit for platform and/or workload performance. As described above, each data array may include any type of memory structure employed by the example workload, such as arrays, files, heaps, stacks, registers, etc. The example data element tracker 106 may also collect intelligence from the workload to send to the example data element performance calculator 108.

The example data element performance calculator 108 analyzes the stored instances of data access and generates a table of one or more data access behaviors associated with each data array performing one or more read/write operations to a memory. As described in further detail below, the table generated by the example data element performance calculator 108 may include a count of the number of memory access attempts (access count) associated with each data array, a count of the number of instances where a memory access attempt results in delay (e.g., processor spin, processor waiting for a memory to become available for read/write operation(s), stalls associated with loads and/or stores), and/or a number of cycles that occur during instances where the memory access attempt(s) cause a processor spin (e.g., a processor wait event). Based on, in part, one or more count values identified by the example data element performance calculator 108, the table of data access behaviors may rank (e.g., prioritize) each of the data arrays. In some examples, the rank (e.g., priority) is based on a number of data array access instances to memory, while in other examples the rank is based on a number of processor cycles that result from data array access instances to memory. Generally speaking, while a first data array may include a relatively greater number of access attempts to one or more memories (e.g., the primary memory 120) when compared to a second data array, each memory access instance by the first data array may be associated with a relatively small amount of data transfer. As such, a relatively high count associated with the first data array may not be indicative of a candidate change (e.g., optimization) for improving platform 116 performance via reallocation of data array (e.g., a data element) usage of the primary memory 120 to the relatively faster secondary memory 122. On the other hand, in some examples a relatively low count associated with the first data array may also be associated with a relatively large amount of data transfer during each access attempt. In such examples, a faster memory may be beneficial when configuring (e.g., optimizing) the platform 116 performance to reduce (e.g., minimize) and/or eliminate processor spin that may otherwise occur when relatively slow memory cannot perform read/writer operation(s) fast enough.

FIG. 2 illustrates an example table 200 generated by the example data element performance calculator 108. In the illustrated example of FIG. 2, the table 200 includes a data element column 202, an access count column 204, a wait count column 206 and a processor wait cycle count column 208. The example data element column 202 includes a list of data arrays identified by the example data element identifier 104 that have participated in the example workload 118. While the illustrated example of FIG. 2 includes arrays, methods, articles of manufacture and/or apparatus disclosed herein are not limited thereto. For example, other forms of memory may be realized including, but not limited to scratch memory, scratchpad(s), heaps, dynamically allocated data objects, stacks, etc. For each identified data array, the example table 200 includes a corresponding count value in the access count column 204 that is indicative of the number of times the data array has made an access attempt (e.g., read, write, etc.) to a memory of the platform 116. Additionally, the example table 200 includes a corresponding count value in the wait count column 206 indicative of the number of times the data array access has caused a corresponding wait for the processor. For example, a first row 210 of the table 200 is associated with "Array 1," which accessed memory 712 times, but none of those access instances caused any corresponding spin/wait for the processor 124, as shown by the "0" in the example wait count column 206. As such, the example "Array 1" did not cause any corresponding cycle count of the example processor 124, as shown by the "0" in the example processor wait cycle count column 308.

On the other hand, an example third row 212 of the table 200 is associated with "Array 3," and accessed memory 6,219 times in which 101 instances of memory access caused the example processor 124 to wait. The corresponding number of processor cycles caused by the 101 instances of processor 124 waiting is 5,050 (e.g., each of the 101 access attempts caused a delay of fifty processor cycles). An example fifth row 214 of the table 200 is associated with "Array 5," and accessed memory 3,921 times in which 2,971 instances of memory access caused the example processor 124 to wait. While "Array 5" accessed memory roughly half as many times as "Array 3," the corresponding number of processor cycles caused by the 2,971 instances of processor 124 waiting during "Array 5" memory accesses is $2.1 \times 10^9$. Relatively speaking, the delay caused by "Array 5" memory accesses is substantially greater than the one or more delays caused by other data arrays associated with the workload 118 and, thus, example "Array 5" may be a candidate for use with the secondary memory 122.

In some examples, data elements place memory access demands at one or more instances during execution of the example workload 118. For example, a first data element (e.g., "Array 5") may perform all of its memory access operations during the first half of the execution process associated with workload 118, while the last half of the execution process does not include further access attempts to the first data element. The information associated with when data elements place demands on platform 116 memory may allow the example workload manager 100 to allocate memory usage in a manner that preserves the limited resources of the secondary memory 122.

Figure 3:
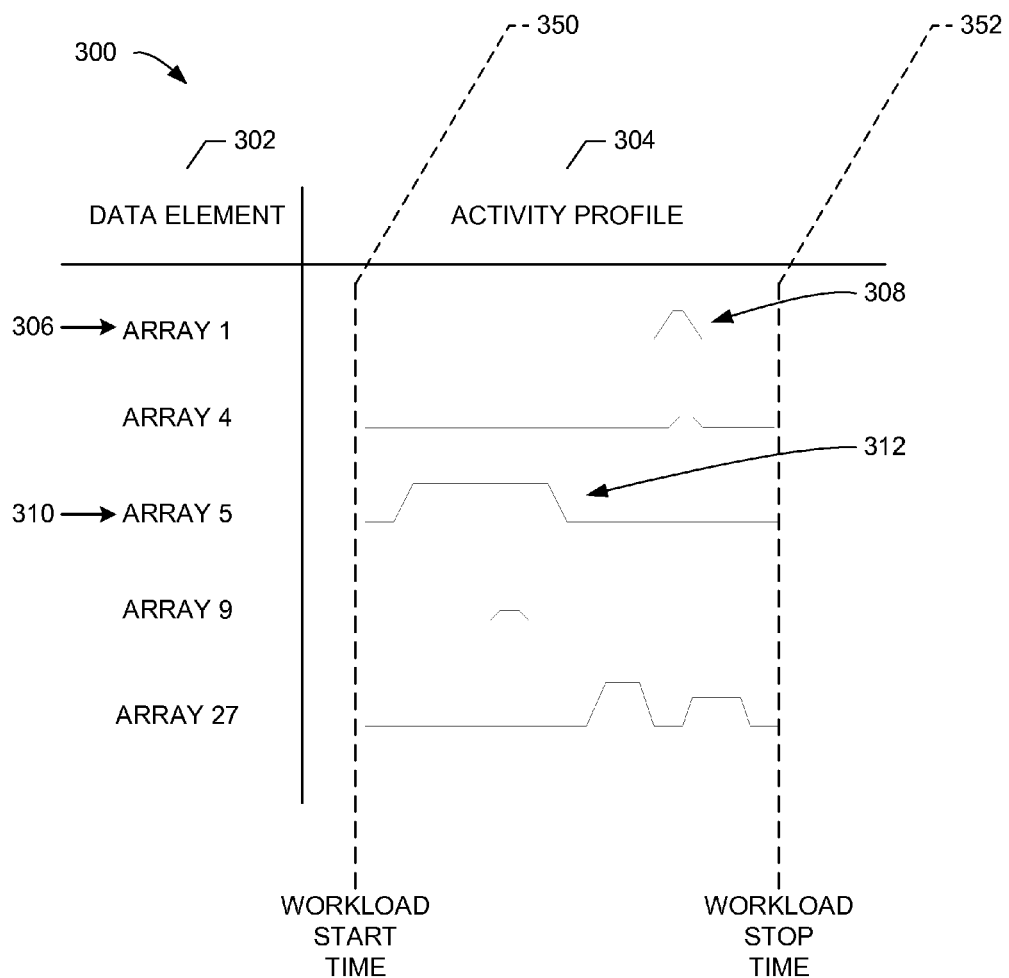
FIG. 3 is an example table indicative of example data array profiles that request memory access of a platform.

FIG. 3 illustrates an example data array profile table 300 generated by the data element performance calculator 108. In the illustrated example of FIG. 3, the table 300 includes a data element column 302 and an activity profile column 304. The example data element performance calculator 108 generates a plot of memory access activity for each corresponding data element (e.g., "Array 1" through "Array 27") during the course of execution (e.g., workload start time 350 through workload stop time 352) of the example workload 118. During the course of execution (horizontal axis), each plot represents a relative magnitude of access activity with respect to other data elements. A first row 306 of the example table 300 is associated with data element "Array 1" and indicates, with an activity profile 308, that memory access activity occurs during the last three-fourths of workload execution. A third row 310 of the example table 300 is associated with data element "Array 5" and indicates, with an activity profile 312, memory access activity occurs during the first half of workload execution. Additionally, the memory access activity profile associated with "Array 5" 312 is taller than the memory access activity profile associated with "Array 1" 308, which indicates a relative difference in the number of access attempts per unit of time for each data element. In some examples, each access activity profile height is compared against one or more thresholds indicative of a number of memory access instances during a period of time during workload 118 execution. Other example thresholds may be based on a number of processor cycles that occur during processor wait periods (spin) due to memory latency and/or bandwidth limitations. While the example thresholds may be based on express values, other example thresholds may be based on a relative percentage when compared to all of the data arrays active during workload 118 execution.

After the example workload 118 is executed and/or executed for a number of iterations to collect data array (and/or any other type of memory) behavior information (e.g., workload execution profiles, data element access counts, wait instance counts (e.g., processor wait), etc.), the example data element identifier 104 selects one of the data elements from the example data element column 202 of the table 200. The example memory manager 110 determines a size of the example secondary memory 122 and a corresponding amount of remaining space of the secondary memory 122 that is unused. In the event that the selected data element under review is indicative of high demand throughout the duration of workload 118 execution, and there is enough remaining space in the example secondary memory 122, then the example code modifier 112 flags the data element to use the secondary memory 122 during execution. In other examples, there may be temporal variations of memory use during the life of the workload. A threshold value may be used to determine whether the selected data element should utilize the secondary memory 122. As described below, data elements that are flagged to use a specific memory, such as the faster secondary memory 122, are later modified by the example code modifier 112, compiled and/or linked to generate a new binary and/or modify an existing binary (e.g., without prior source code modification(s)).

However, in the event that the selected data element does not utilize memory and/or make memory access attempts throughout the duration of the workload 118 execution, then the example memory manager 110 determines whether the selected data element utilizes a threshold amount of memory resources during a portion of the workload 118 execution. In operation, the example memory manager 110 may analyze the activity profiles in the activity profile column 304 associated with the data element of interest to identify a threshold demand. For example, if the data element associated with "Array 5" is analyzed by the memory manager 110, the memory manager 110 may invoke the example code modifier 112 to modify code (e.g., source code, one or more binaries, etc.) to utilize secondary memory 122 for a first half of the workload 118, and utilize primary memory 120 for a second half of the workload 118. Splitting memory utilization throughout the duration of the example workload 118 may allow higher demand data elements to operate faster when needed, and relinquish such memory when no longer needed, as shown by each corresponding data element profile of FIG. 3.

While an example manner of implementing the workload manager 100 has been illustrated in FIGS. 1-3, one or more of the elements, processes and/or devices illustrated in FIGS. 1-3 may be combined, divided, re-arranged, omitted, eliminated and/or implemented in any other way. Further, the example workload manager 100, the example workload manager 102, the example data element identifier 104, the example data element tracker 106, the example data element performance calculator 108, the example memory manager 110, the example code modifier 112, the example primary memory 120 and/or the example secondary memory 122 of FIG. 1 may be implemented by hardware, software, firmware and/or any combination of hardware, software and/or firmware. Thus, for example, any of the example workload manager 100, the example workload manager 102, the example data element identifier 104, the example data element tracker 106, the example data element performance calculator 108, the example memory manager 110, the example code modifier 112, the example primary memory 120 and/or the example secondary memory 122 could be implemented by one or more circuit(s), programmable processsor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example workload manager 100, the example workload manager 102, the example data element identifier 104, the example data element tracker 106, the example data element performance calculator 108, the example memory manager 110, the example code modifier 112, the example primary memory 120 and/or the example secondary memory 122 are hereby expressly defined to include at least one tangible computer readable medium such as a memory, DVD, CD, BluRay, etc. storing the software and/or firmware. Further still, the example workload manager 100 of FIG. 1 may include one or more elements, processes and/or devices in addition to, or instead of, those illustrated in FIGS. 1-3, and/or may include more than one of any or all of the illustrated elements, processes and devices.

Figure 4:
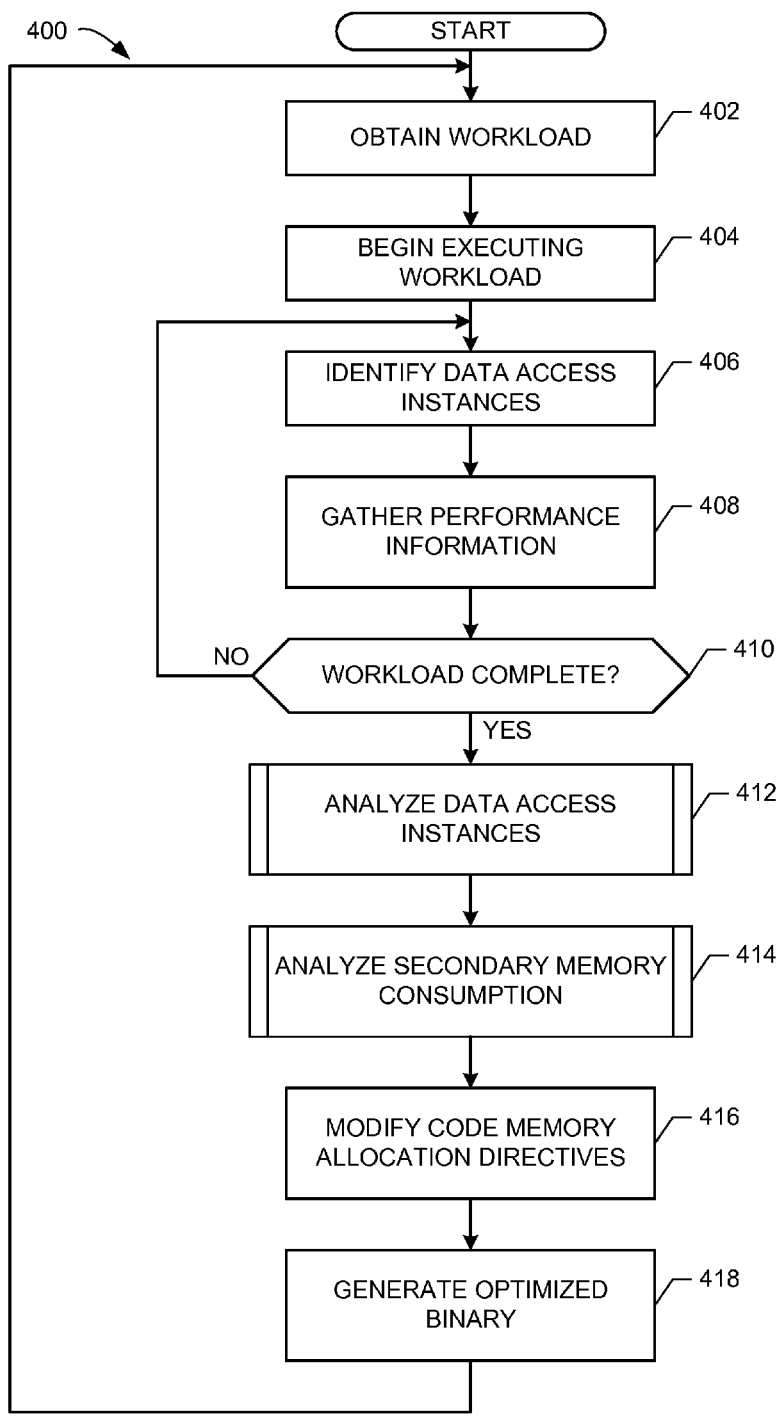
FIGS. 4-6 are flowcharts representative of example machine readable instructions which may be executed to manage workload memory allocation, to implement the example workload manager of FIG. 1, and/or to build the tables of FIGS. 2 and 3.

A flowchart representative of example machine readable instructions for implementing the workload manager 100 of FIG. 1 is shown in FIG. 4. In this example, the machine readable instructions comprise a program for execution by a processor such as the processor 712 shown in the example computer 700 discussed below in connection with FIG. 7. The program may be embodied in software stored on one or more tangible computer readable medium(s) such as a CD-ROM, a floppy disk, a hard drive, a digital versatile disk (DVD), a BluRay disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example workload manager 100 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer readable instructions) stored on one or more tangible computer readable medium(s) such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program 400 of FIG. 4 begins at block 402 in which the example workload manager 102 retrieves, obtains and/or otherwise receives the workload 118 from the platform 116. The example workload 118 may be stored on a memory of the platform and may include one or more executable programs that utilize one or more resources of the example platform 116. Any number of execution iterations may be invoked by the example workload manager 102 to characterize the behavior of the workload on the example platform 116 (block 404). In some examples, the workload manager 102 invokes the workload 118 to execute once on the platform 116 when collecting one or more parameters indicative of data element behavior. In other examples, the workload manager 102 invokes the workload 118 to execute through a number of iterations to calculate average values of the one or more parameters indicative of data element behavior.

During execution of the example workload 118, the data element identifier 104 identifies instances of data array access attempts to one or more memories of the platform 116, such as data array(s) that attempt to access the primary memory 120 (block 406). Generally speaking, some data arrays are invoked by the workload 118 infrequently and, thus, do not substantially contribute to workload 118 execution delay. In other examples, other data arrays that are invoked by the workload 118 make relatively frequent attempts at memory access (e.g., read/write access attempts), thereby potentially contributing to overall workload 118 execution time to a greater extent. To identify a degree with which data arrays interact with platform 116 memory, the example data element tracker 106 gathers performance information, such as, but not limited to counting a number of instances each data array makes a memory access request and/or identifying processor stalls (block 408). Counting data access instances may include, but is not limited to, employing a performance monitoring unit (PMU) to gather data from one or more model specific registers (MSRs). The MSRs may include counter registers, event programming registers and/or global event registers. Additionally, the PMU may perform event based sampling to count events related to processor activity, such as instances where the processor waits for memory availability caused by, for example, memory latency and/or memory bandwidth limitations. In some examples, sampling may occur in response to perturbation of the workload to appreciate the effect(s) of one or more forced input(s) to the workload and/or platform.

While the example workload 118 of interest executes on the example platform 116 (block 410), control returns to blocks 406 and 408 any number of times to identify data access instances and count a number of times each data array makes a memory access attempt. When execution of the example workload 118 of interest is complete (block 410), the example data element performance calculator 108 generates a table (e.g., the table 200 of FIG. 2) of the collected parameters (block 412). The collected parameters may include, but are not limited to a list of data arrays that have made one or more access attempts to memory, a count of how many times each data array makes an access attempt to memory during the workload 118 execution, a count of how many times an access attempt by the data array causes a corresponding delay (e.g., wait instances, a processor spin, cause processor to wait on memory that is not finished with a prior read/write operation), and/or a count of a number of processor cycles that elapse during the workload 118 execution while the processor is waiting for access to the memory (e.g., the primary memory 120). While the example table 200 (see FIG. 2) is described herein as being created by the example data element performance calculator 108, any other type of workload profile representation may be generated including, but not limited to a heatmap of data array memory access activity. Additionally, the example data element performance calculator 108 generates an example data array profile table 300 (see FIG. 3) to identify a temporal indication of data array memory access during execution of the workload 118 (block 412) as described in further detail below.

To determine whether one or more data arrays can efficiently utilize the secondary memory 122 during execution of the workload 118, the example memory manager 110, the example data element identifier 104, the example data element performance calculator 108, and the example code modifier 112 analyze secondary memory consumption (block 414). As described in further detail below, one or more data arrays may be allocated to use higher-performing secondary memory 122 if a corresponding performance improvement is expected. In the event that a performance improvement is expected, the example code modifier 112 modifies code (e.g., source code, one or more binaries, etc.) associated with one or more data arrays so that the higher-performing secondary memory 122 is utilized during execution of the workload 118 (block 416). The example linker interface 114 invokes a compiler/linker to compile and/or link the modified code to generate a new binary that is improved (e.g., optimized) to utilize the higher-performing secondary memory 122 during all or part of the workload 118 execution (block 418). In some examples, a compiler is not needed and/or otherwise bypassed when one or more binaries are being modified without concern for corresponding source code. In other examples, profile information may be analyzed and direct the example linker interface 114, a binary modifier and/or a runtime loader to regenerate one or more binaries.

Figure 5:
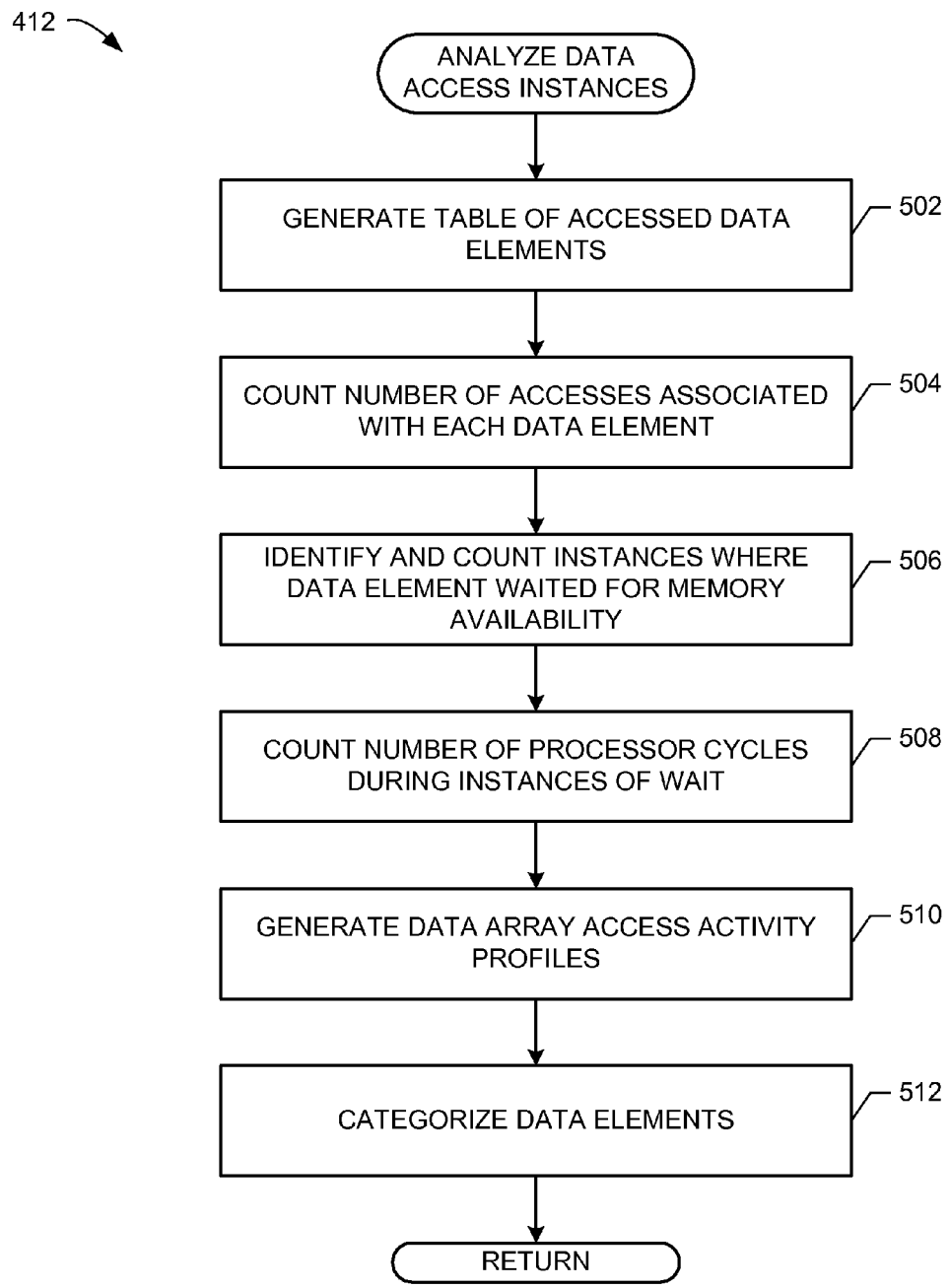

Turning to FIG. 5, additional detail associated with analyzing data access instances (block 412) is shown. In the illustrated example of FIG. 5, the example data element performance calculator 108 generates a table with data elements (data arrays) that have performed at least one data access attempt to platform 116 memory, such as the example primary memory 120 (block 502). For instance, the example table 200 of FIG. 2 includes a data element column 202 containing a list of one or more data arrays that have made one or more attempts to access platform 116 memory. The example data element performance calculator 108 also counts a number of access attempts associated with each data element (block 504), as shown in the example access count column 204 of FIG. 2. In the event one or more of the data elements in the example data element column 202 include a data array that caused the processor 124 to wait (e.g., a spin of wasted processor cycles), the example data element performance calculator 108 counts a corresponding number of instances of that occurrence (block 506). Additionally, a degree of severity of such processor wait instances is determined by the example data element performance calculator 108 by counting a corresponding number of processor cycles that occur during such wait instances (block 508).

To determine temporal portions of the workload 118 execution in which one or more data arrays access memory, the example data element performance calculator 108 generates a data array profile table 300 (block 510), as shown in FIG. 3. As described above, the data element performance calculator 108 generates a profile associated with each data array to show which relative portion of the workload 118 execution is associated with memory access activity. At least one benefit of determining relative temporal locations within the workload 118 where a data array accesses memory, is that the higher-performing secondary memory 122 can be judiciously shared between one or more data arrays during execution of the workload 118. For example, if two data arrays of the workload 118 cannot both be utilized simultaneously due to memory size limitations of the secondary memory 122, a first data array may use the secondary memory 122 for a portion of the workload 118 execution, and then relinquish the secondary memory 122 so that a second data array can utilize the secondary memory 122 for the remaining portion of the workload 118 execution. The example data element performance calculator 108 may also categorize the one or more data elements based on one or more thresholds and/or assign a rank order to determine which data elements should be allocated to the higher-performing secondary memory 122 (block 512). In other examples, developing a cost model of performance may indicate that utilization of the secondary memory 122 may not result in an appreciated benefit to overall platform performance.

Figure 6:
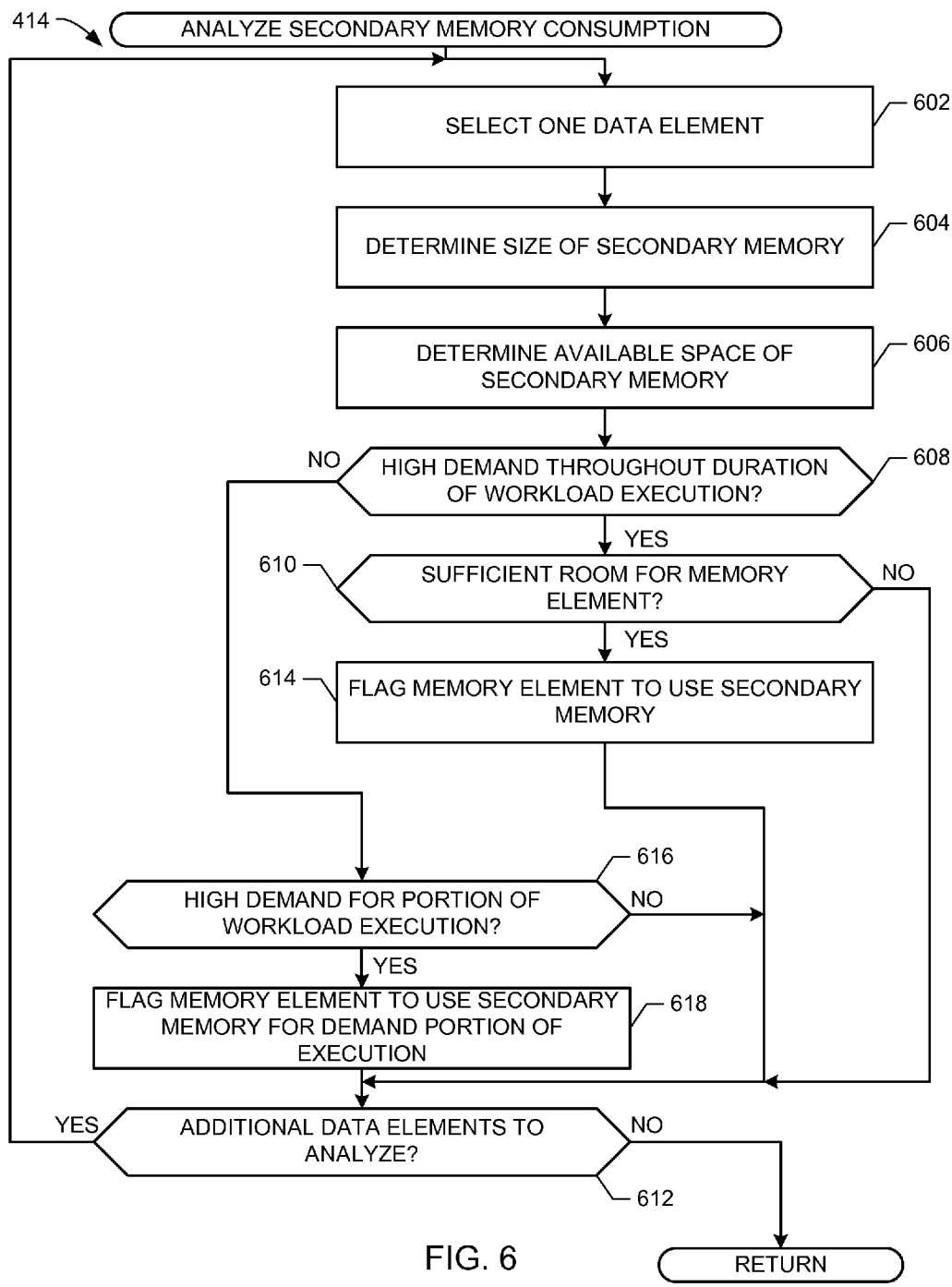

Turning to FIG. 6, additional detail associated with analyzing the secondary memory 122 consumption (block 414) is shown. In the illustrated example of FIG. 6, the example data element identifier 104 selects one of the data elements (data arrays) of interest from the table 200 of FIG. 2 and/or the data array profile table 300 of FIG. 3. In some examples, the data element is selected based on a corresponding rank order, as described above. For instance, the data element associated with a highest processor count wait value may be selected as the best candidate data element for improving (e.g., optimizing) platform 116 performance. Higher-performing secondary memory, such as the example secondary memory 122, may be substantially smaller and/or more expensive than primary memory 120. To determine the size of secondary memory 122 associated with the platform 116, the example memory manager 110 determines a corresponding size of the secondary memory 122 (block 604), and determines available remaining space thereof (block 606). In other examples, the size of the secondary memory 122 is static and may be performed once rather than within a loop, such as after a workload is obtained (block 402).

If the example data element performance calculator 108 determines that the data array of interest exhibits a relatively high occurrence of access attempts to memory throughout the execution of the example workload 118 (block 608), then the example memory manager 110 determines whether the secondary memory 122 has sufficient space to accommodate the data array of interest (block 610). If not, then the example data element identifier 104 determines whether additional candidate data arrays are available for consideration (block 612). For example, the data element identifier 104 may select the next-highest ranked data array in the table 200 of FIG. 2. On the other hand, in the event that there is sufficient room in the secondary memory 122 for the candidate data array of interest (block 610), then the example code modifier 112 flags the data array for modification (block 614) so that, after all candidate data arrays have been considered, the code (e.g., one or more binaries, source code, etc.) associated with the flagged data arrays may be modified (see block 416 of FIG. 4).

In the event that the data element performance calculator 108 determines that the data array of interest attempts to access memory for a portion of time (e.g., a threshold portion) during workload 118 execution (block 608), then the example memory manager determines whether such access attempts exceed a threshold demand (block 616). As described above, the threshold demand may be indicative of a number of memory access instances during a period of time during workload 118 execution, a relative number of memory access instances when compared to all data arrays and/or based on a number (or relative number) of processor cycles that occur during processor wait periods (spin) due to memory latency and/or bandwidth limitations. During the portion of workload 118 execution time at which the data element (data array) of interest exceeds one or more threshold values that are indicative of memory access demands and/or indicative of causing processor cycle delay, the example code modifier 112 flags the data element of interest to use the secondary memory 122 for that portion of the workload 118 execution (block 618). If additional data elements remain in the example table 200 of FIG. 2 and/or the data array profile table 300 of FIG. 3 (block 612), then control returns to block 602.

Figure 7:
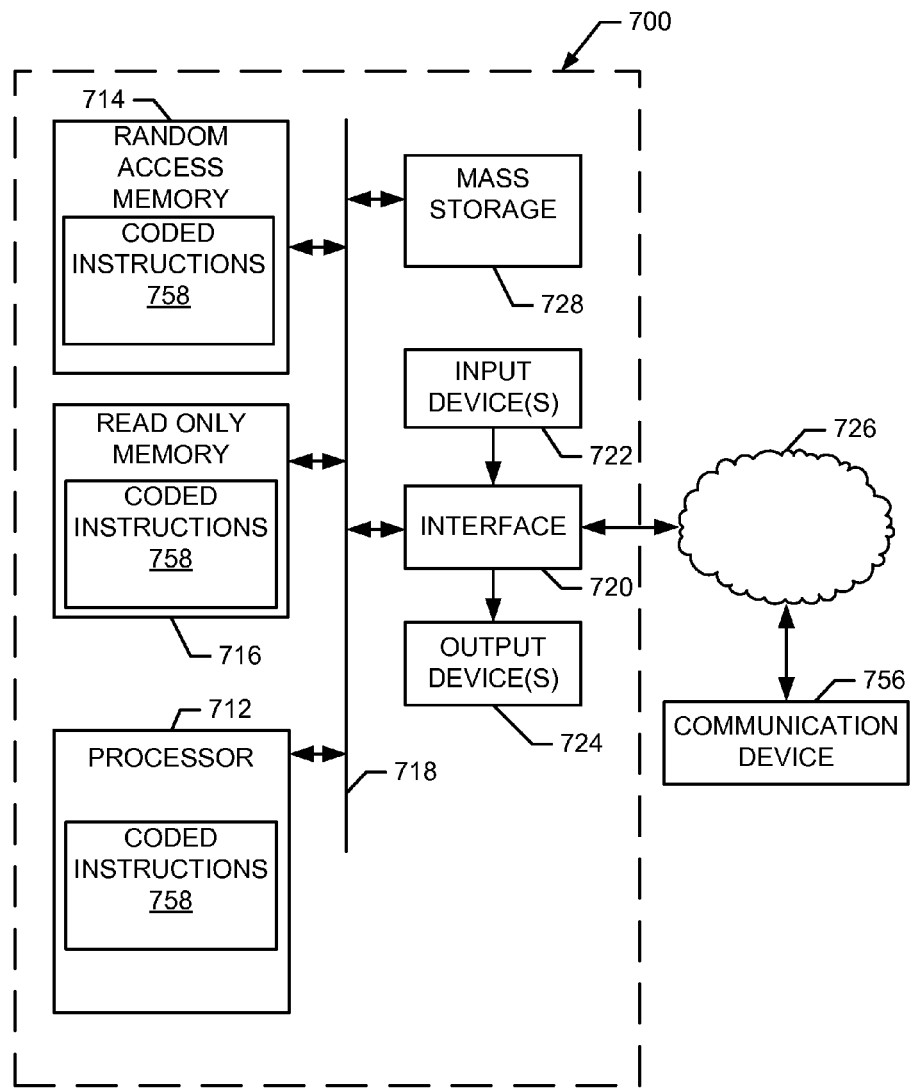
FIG. 7 is a block diagram of an example system that may execute the example machine readable instructions of FIGS. 4-6 to implement the example workload manager of FIG. 1, and/or to build the tables of FIGS. 2 and 3.

FIG. 7 is a block diagram of an example computer 700 capable of executing the instructions of FIGS. 4-6 to implement the workload manager 100 of FIG. 1. The computer 700 can be, for example, a server, a personal computer, a mobile phone (e.g., a cell phone), a personal digital assistant (PDA), an Internet appliance, a gaming console, a set top box, or any other type of computing device.

The computer 700 of the instant example includes a processor 712. For example, the processor 712 can be implemented by one or more microprocessors or controllers from any desired family or manufacturer.

The processor 712 is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The computer 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device (e.g., communication device 756) such as a modem or network interface card to facilitate exchange of data with external computers via a network 726 (e.g., an Ethernet connection, a digital subscriber line (DSL), a telephone line, coaxial cable, a cellular telephone system, etc.).

The computer 700 also includes one or more mass storage devices 728 for storing software and data. Examples of such mass storage devices 728 include floppy disk drives, hard drive disks, compact disk drives and digital versatile disk (DVD) drives.

The coded instructions 758 of FIGS. 4-6 may be stored in the mass storage device 728, in the volatile memory 714, in the non-volatile memory 716, and/or on a removable storage medium such as a CD or DVD.

From the foregoing, it will be appreciated that the above disclosed methods, apparatus and articles of manufacture facilitate memory management by identifying candidate data elements, which may include data arrays, stack, heap, etc., that utilize memory resources responsible for platform delay. By rewriting code (e.g., source code, one or more binaries, etc.) in a manner that allocates the candidate data elements to use a higher-performing memory type, the overall operation of the platform may be improved (e.g., optimized) by reducing or even eliminating wasted processor cycles caused by data elements waiting on access to relatively slower memory.

Methods, systems, apparatus and articles of manufacture are disclosed to manage workload memory allocation. Some disclosed example methods include identifying a primary memory and a secondary memory associated with a platform, the secondary memory having first performance metrics different from second performance metrics of the primary memory, identifying access metrics associated with a plurality of data elements invoked by a workload during execution on the platform, prioritizing a list of the plurality of data elements based on the access metrics associated with corresponding ones of the plurality of data elements, and reallocating a first one of the plurality of data elements from the primary memory to the secondary memory based on the priority of the first one of the plurality of memory elements. Additionally, the example methods include the secondary memory having a lower latency than the primary memory, or the secondary memory having a higher bandwidth than the primary memory. In some examples, the access metrics include a number of access attempts by corresponding ones of the plurality of data elements to the primary memory, include detecting whether at least one of the number of access attempts caused a wait event, include counting a number of processor cycles associated with the wait event, and where prioritizing the list of the plurality of data elements includes comparing the number of processor cycles associated with each of the plurality of data elements. Some examples include prioritizing the list of the plurality of data elements by comparing the number of wait events associated with the plurality of data elements, and in other examples identifying the access metrics further includes measuring a number of access attempts per unit of time associated with the plurality of data elements. Examples disclosed herein also include selecting one of the plurality of data elements to reallocate from the primary memory to the secondary memory when the number of access attempts per unit of time exceeds a threshold value, and further include reallocating a first one of the plurality of data elements from the primary memory to the secondary memory when the number of access attempts per unit of time exceeds a threshold, and reallocating the first one of the plurality of data elements from the secondary memory to the primary memory when the number of access attempts per unit of time is lower than the threshold. Still further examples include the first one of the plurality of data elements utilizing the secondary memory for a first portion of the execution of the workload, and utilizing the primary memory for a second portion of the execution of the workload. Some examples include the first one of the plurality of data elements utilizing the secondary memory while a second one of the plurality of data elements utilizes the primary memory, and other examples include alternating the utilization of the first one of the plurality of data elements from the secondary memory to the primary memory with the utilization of the second one of the plurality of data elements from the primary memory to the secondary memory. Other examples include reallocating the first one of the plurality of data elements from the primary memory to the secondary memory when the secondary memory has space for the first one of the plurality of data elements.

Example apparatus to manage workload memory for data element utilization include a workload manager to identify a primary memory and a secondary memory associated with a platform, the secondary memory having first performance metrics different from second performance metrics of the primary memory, a workload controller to identify access metrics associated with a plurality of data elements invoked by a workload during execution on the platform, a data element performance calculator to prioritize a list of the plurality of data elements based on the access metrics associated with corresponding ones of the plurality of data elements, and a memory manager to reallocate a first one of the plurality of data elements from the primary memory to the secondary memory based on the priority of the first one of the plurality of memory elements. Additional example apparatus include the memory manager selecting the secondary memory based on a lower latency parameter than the primary memory, and in which the memory manager selects the secondary memory based on a higher bandwidth than the primary memory, and/ or in which the data element performance calculator is to determine whether an access attempt to the primary memory causes a wait event. Other example apparatus include a code modifier to reallocate data element usage from the primary memory to the secondary memory when a number of access attempts per unit of time exceeds a threshold value, in which the code modifier modifies at least one of source code or a binary associated with the workload.

Some disclosed example articles of manufacture storing machine readable instructions are included that, when executed, cause a machine to identify a primary memory and a secondary memory associated with a platform, the secondary memory having first performance metrics different from second performance metrics of the primary memory, identify access metrics associated with a plurality of data elements invoked by a workload during execution on the platform, prioritize a list of the plurality of data elements based on the access metrics associated with corresponding ones of the plurality of data elements, and reallocate a first one of the plurality of data elements from the primary memory to the secondary memory based on the priority of the first one of the plurality of memory elements. Other example articles of manufacture cause the machine to determine a quantity of access attempts by corresponding ones of the plurality of data elements to the primary memory, and to detect whether at least one of the number of access attempts caused a wait event. Still other example articles of manufacture cause the machine to count a number of processor cycles associated with the wait event, to compare the number of processor cycles associated with each of the plurality of data elements to prioritize the list of the plurality of data elements, and to compare the number of wait events associated with the plurality of data elements to prioritize the list of the plurality of data elements. Still further articles of manufacture cause the machine to measure measuring a number of access attempts per unit of time associated with the plurality of data elements to identify the access metrics, to select one of the plurality of data elements to reallocate from the primary memory to the secondary memory when the number of access attempts per unit of time exceeds a threshold value, and to reallocate a first one of the plurality of data elements from the primary memory to the secondary memory when the number of access attempts per unit of time exceeds a threshold, and reallocate the first one of the plurality of data elements from the secondary memory to the primary memory when the number of access attempts per unit of time is lower than the threshold. In some example articles of manufacture, the machine is to cause a machine to utilize, with the first one of the plurality of data elements, the secondary memory for a first portion of the execution of the workload, and utilize the primary memory for a second portion of the execution of the workload, and to utilize, with the first one of the plurality of data elements, the secondary memory while a second one of the plurality of data elements utilizes the primary memory. Additionally, example articles of manufacture cause the machine to alternate the utilization of the first one of the plurality of data elements from the secondary memory to the primary memory with the utilization of the second one of the plurality of data elements from the primary memory to the secondary memory, and to reallocate the first one of the plurality of data elements from the primary memory to the secondary memory when the secondary memory has space for the first one of the plurality of data elements.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to manage workload memory for data element utilization, comprising:
    identifying a primary memory and a secondary memory associated with a platform, the secondary memory having first performance metrics different from second performance metrics of the primary memory;
    identifying access metrics associated with a plurality of data elements invoked by a workload during execution on the platform;
    prioritizing a list of the plurality of data elements based on the access metrics associated with corresponding ones of the plurality of data elements; and
    reallocating a first one of the plurality of data elements from the primary memory to the secondary memory based on the priority of the first one of the plurality of memory elements.

2. A method as described in claim 1, wherein the access metrics comprise a number of access attempts by corresponding ones of the plurality of data elements to the primary memory.

3. A method as described in claim 2, further comprising detecting whether at least one of the number of access attempts caused a wait event.

4. A method as described in claim 3, further comprising counting a number of processor cycles associated with the wait event.

5. A method as described in claim 4, wherein prioritizing the list of the plurality of data elements comprises comparing the number of processor cycles associated with each of the plurality of data elements.

6. A method as described in claim 3, wherein prioritizing the list of the plurality of data elements comprises comparing the number of wait events associated with the plurality of data elements.

7. A method as described in claim 1, wherein identifying the access metrics further comprises measuring a number of access attempts per unit of time associated with the plurality of data elements.

8. A method as described in claim 7, further comprising selecting one of the plurality of data elements to reallocate from the primary memory to the secondary memory when the number of access attempts per unit of time exceeds a threshold value.

9. A method as described in claim 7, further comprising reallocating a first one of the plurality of data elements from the primary memory to the secondary memory when the number of access attempts per unit of time exceeds a threshold, and reallocating the first one of the plurality of data elements from the secondary memory to the primary memory when the number of access attempts per unit of time is lower than the threshold.

10. A method as described in claim 9, wherein the first one of the plurality of data elements utilizes the secondary memory for a first portion of the execution of the workload, and utilizes the primary memory for a second portion of the execution of the workload.

11. A method as described in claim 9, wherein the first one of the plurality of data elements utilizes the secondary memory while a second one of the plurality of data elements utilizes the primary memory.

12. A method as described in claim 11, further comprising alternating the utilization of the first one of the plurality of data elements from the secondary memory to the primary memory with the utilization of the second one of the plurality of data elements from the primary memory to the secondary memory.

13. A method as described in claim 1, further comprising reallocating the first one of the plurality of data elements from the primary memory to the secondary memory when the secondary memory has space for the first one of the plurality of data elements.

14. An apparatus to manage workload memory for data element utilization, comprising:
  a workload manager to identify a primary memory and a secondary memory associated with a platform, the secondary memory having first performance metrics different from second performance metrics of the primary memory;
  a workload controller to identify access metrics associated with a plurality of data elements invoked by a workload during execution on the platform;
  a data element performance calculator to prioritize a list of the plurality of data elements based on the access metrics associated with corresponding ones of the plurality of data elements; and
  a memory manager to reallocate a first one of the plurality of data elements from the primary memory to the secondary memory based on the priority of the first one of the plurality of memory elements.

15. An apparatus as described in claim 14, wherein the data element performance calculator is to determine whether an access attempt to the primary memory causes a wait event.

16. An apparatus as described in claim 14, further comprising a code modifier to reallocate data element usage from the primary memory to the secondary memory when a number of access attempts per unit of time exceeds a threshold value.

17. An apparatus as described in claim 14, wherein the code modifier modifies at least one of source code or a binary associated with the workload.

18. At least one tangible machine accessible medium having instructions stored thereon that, when executed, cause a machine to at least:
  identify a primary memory and a secondary memory associated with a platform, the secondary memory having first performance metrics different from second performance metrics of the primary memory;
  identify access metrics associated with a plurality of data elements invoked by a workload during execution on the platform;
  prioritize a list of the plurality of data elements based on the access metrics associated with corresponding ones of the plurality of data elements; and
  reallocate a first one of the plurality of data elements from the primary memory to the secondary memory based on the priority of the first one of the plurality of memory elements.

19. At least one tangible machine accessible medium as described in claim 18 having instructions stored thereon that, when executed, cause a machine to determine a quantity of access attempts by corresponding ones of the plurality of data elements to the primary memory.

20. At least one tangible machine accessible medium as described in claim 19 having instructions stored thereon that, when executed, cause a machine to detect whether at least one of the number of access attempts caused a wait event.

21. At least one tangible machine accessible medium as described in claim 20 having instructions stored thereon that, when executed, cause a machine to count a number of processor cycles associated with the wait event.

22. At least one tangible machine accessible medium as described in claim 21 having instructions stored thereon that, when executed, cause a machine to compare the number of processor cycles associated with each of the plurality of data elements to prioritize the list of the plurality of data elements.

23. At least one tangible machine accessible medium as described in claim 21 having instructions stored thereon that, when executed, cause a machine to compare the number of wait events associated with the plurality of data elements to prioritize the list of the plurality of data elements.

24. At least one tangible machine accessible medium as described in claim 18 having instructions stored thereon that, when executed, cause a machine to measure measuring a number of access attempts per unit of time associated with the plurality of data elements to identify the access metrics.

25. At least one tangible machine accessible medium as described in claim 24 having instructions stored thereon that, when executed, cause a machine to select one of the plurality of data elements to reallocate from the primary memory to the secondary memory when the number of access attempts per unit of time exceeds a threshold value.

26. At least one tangible machine accessible medium as described in claim 24 having instructions stored thereon that, when executed, cause a machine to reallocate a first one of the plurality of data elements from the primary memory to the secondary memory when the number of access attempts per unit of time exceeds a threshold, and reallocate the first one of the plurality of data elements from the secondary memory to the primary memory when the number of access attempts per unit of time is lower than the threshold.

27. At least one tangible machine accessible medium as described in claim 26 having instructions stored thereon that, when executed, cause a machine to utilize, with the first one of the plurality of data elements, the secondary memory for a first portion of the execution of the workload, and utilize the primary memory for a second portion of the execution of the workload.

28. At least one tangible machine accessible medium as described in claim 26 having instructions stored thereon that, when executed, cause a machine to utilize, with the first one of the plurality of data elements, the secondary memory while a second one of the plurality of data elements utilizes the primary memory.

29. At least one tangible machine accessible medium as described in claim 28 having instructions stored thereon that, when executed, cause a machine to alternate the utilization of the first one of the plurality of data elements from the secondary memory to the primary memory with the utilization of the second one of the plurality of data elements from the primary memory to the secondary memory.

30. At least one tangible machine accessible medium as described in claim 18 having instructions stored thereon that, when executed, cause a machine to reallocate the first one of the plurality of data elements from the primary memory to the secondary memory when the secondary memory has space for the first one of the plurality of data elements.

* * * * *